US012482352B2

(12) United States Patent
Fowe

(10) Patent No.: US 12,482,352 B2
(45) Date of Patent: Nov. 25, 2025

(54) METHOD, APPARATUS, AND COMPUTER PROGRAM PRODUCT FOR DETERMINING LANE CLOSURES ALONG A ROAD

(71) Applicant: HERE GLOBAL B.V., Eindhoven (NL)

(72) Inventor: James Adeyemi Fowe, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 427 days.

(21) Appl. No.: 17/645,094

(22) Filed: Dec. 20, 2021

(65) Prior Publication Data

US 2023/0196915 A1 Jun. 22, 2023

(51) Int. Cl.
*G08G 1/09* (2006.01)
*G08G 1/01* (2006.01)
*G08G 1/0967* (2006.01)

(52) U.S. Cl.
CPC ..... *G08G 1/096725* (2013.01); *G08G 1/0112* (2013.01); *G08G 1/0133* (2013.01); *G08G 1/0141* (2013.01); *G08G 1/0145* (2013.01); *G08G 1/096791* (2013.01)

(58) Field of Classification Search
CPC ........... G08G 1/096725; G08G 1/0112; G08G 1/0133; G08G 1/0141; G08G 1/0145; G08G 1/096791; G08G 1/096827; G08G 1/0969
See application file for complete search history.

(56) References Cited

U.S. PATENT DOCUMENTS

| | | | | |
|---|---|---|---|---|
| 8,606,512 | B1 * | 12/2013 | Bogovich | H04W 4/40 701/410 |
| 9,171,461 | B1 * | 10/2015 | Dabell | G08G 1/096775 |
| 9,240,123 | B2 | 1/2016 | Stenneth | |
| 9,816,823 | B2 | 11/2017 | Wang et al. | |
| 10,140,856 | B2 | 11/2018 | Bernhardt et al. | |
| 10,453,337 | B2 * | 10/2019 | Anastassov | G08G 1/096758 |
| 10,559,201 | B1 * | 2/2020 | Bauer | G08G 1/0145 |
| 11,908,317 | B2 * | 2/2024 | Abdel-Aty | G08G 1/0112 |

(Continued)

OTHER PUBLICATIONS

Lin et al., "Development of a Fuzzy-Expert System for Incident Detection and Classification", Mathematical and Computer Modelling, vol. 27, Issues 9-11, (May-Jun. 1998), pp. 9-25.

*Primary Examiner* — Tyler J Lee
(74) *Attorney, Agent, or Firm* — ALSTON & BIRD LLP

(57) ABSTRACT

A method is provided for determining and verifying lane closures using lane-level map-matching to monitor all lanes of a road. Methods may include: receiving a plurality of probe data points, where the probe data points; map-matching the probe data points to one or more road segments; determining, for the probe data points, lanes of travel of the one or more road segments; determining a volume of traffic along the lanes of travel of the one or more road segments based on the lanes of travel of the one or more road segments determined for the probe data; determining an expected volume of traffic along the lanes of travel; and generating an indication of a lane closure in response to a volume of traffic along a first lane of travel of the one or more road segments being a predetermined amount below an expected volume of traffic.

20 Claims, 5 Drawing Sheets

(56) References Cited

U.S. PATENT DOCUMENTS

| | | | | |
|---|---|---|---|---|
| 2016/0379485 | A1* | 12/2016 | Anastassov | G08G 1/0129 701/117 |
| 2017/0124863 | A1* | 5/2017 | Dumazert | G08G 1/0112 |
| 2018/0158325 | A1* | 6/2018 | Bernhardt | G08G 1/0129 |
| 2018/0182238 | A1* | 6/2018 | Fowe | G08G 1/0112 |
| 2020/0158530 | A1 | 5/2020 | Xu et al. | |
| 2020/0372262 | A1* | 11/2020 | Ma | G06V 20/58 |
| 2020/0393261 | A1* | 12/2020 | Zhang | G08G 1/0133 |
| 2021/0142659 | A1 | 5/2021 | Chen et al. | |

* cited by examiner

METHOD, APPARATUS, AND COMPUTER PROGRAM PRODUCT FOR DETERMINING LANE CLOSURES ALONG A ROAD

TECHNOLOGICAL FIELD

An example embodiment of the present invention relates to determining lane closures along a road, and more particularly, to determining and verifying lane closures using lane-level map-matching to monitor all lanes of a road.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as vehicle speed profile information based on historical speed profiles of vehicles traveling among a road network.

Vehicle and traffic data that is provided on digital maps is generally based on crowd-sourced data from mobile devices or probe data. The traffic data is typically reflective of a collective group of mobile devices traveling along a road segment, and may be useful in vehicle navigation applications in order for a user to avoid heavy or slow traffic routes between an origin and a destination. Dynamic changes to a road can impact traffic flow and change how a vehicle chooses to navigate a route.

BRIEF SUMMARY

A method, apparatus, and computer program product are provided in accordance with an example embodiment for determining lane closures along a road, and more particularly, to determining and verifying lane closures using lane-level map-matching to monitor all lanes of a road. Embodiments described herein provide an apparatus including at least one processor and at least one non-transitory memory including computer program code instructions, computer program code instructions configured to, when executed, cause the apparatus to at least: receive a plurality of probe data points, where the probe data points include at least a location and a timestamp associated with a respective probe data point; map-match the probe data points to one or more road segments of a road network; determine, for the probe data points, lanes of travel of the one or more road segments; determine a volume of traffic along the lanes of travel of the one or more road segments based on the lanes of travel of the one or more road segments determined for the probe data; determine an expected volume of traffic along the lanes of travel of the one or more road segments; generate an indication of a lane closure in response to a volume of traffic along a first lane of travel of the one or more road segments being a predetermined amount below an expected volume of traffic for the first lane of travel of the one or more road segments; and provide for at least one of route guidance information or at least semi-autonomous vehicle control in response to the indication of the lane closure.

According to an example embodiment, each probe data point of the plurality of probe data points is received from a probe apparatus of a plurality of probe apparatuses, each probe apparatus including one or more sensors and being onboard a respective vehicle. Causing the apparatus of certain embodiments to determine the volume of traffic along the lanes of travel of the one or more road segments includes causing the apparatus to determine a volume of traffic along the lanes of travel of the one or more road segments for an epoch having a first context. Causing the apparatus of certain embodiments to determine the expected volume of traffic along the lanes of travel of the one or more road segments includes causing the apparatus to determine the expected volume of traffic along the lanes of travel of the one or more road segments for a past epoch having a second context within a predefined similarity of the first context. The predefined similarity between the first context and the second context includes, in some embodiments, one or more of: same day of week, same time of day, same season of year, or same environmental conditions.

According to some embodiments, the predetermined amount below the expected volume of traffic for the first lane of travel of the one or more road segments comprises at least fifty percent less than the expected volume of traffic for the first lane of travel of the one or more road segments. Causing the apparatus of certain embodiments to map-match the probe data points to one or more road segments of a road network includes causing the apparatus to: identify one or more road segments corresponding to the probe data points based on latitude and longitude of the probe data points; determine lateral positions of the probe data points from a centerline of the identified one or more road segments; cluster the probe data points according to available lanes of the identified one or more road segments; and map-match the clustered probe data points to the available lanes of the identified one or more road segments. Causing the apparatus of certain embodiments to provide for at least one of route guidance information or at least semi-autonomous vehicle control in response to the indication of the lane closure includes causing the apparatus to: identify a lane closure of a road segment of the one or more road segments from the indication of the lane closure; determine a path including the road segment and an available lane of travel along the road segment; and cause at least semi-autonomous vehicle control to move a vehicle to the available lane of travel along the road segment. The apparatus of certain embodiments is further caused to receive an indication of a lane closure of the first lane of travel of the one or more road segments associated with a road work event, and increase a confidence of the indication of the lane closure.

Embodiments provided herein include a computer program product including at least one non-transitory computer-readable storage medium having computer-executable program code instructions stored therein, the computer-executable program code instructions including program code instructions to: receive a plurality of probe data points, where the probe data points include at least a location and a timestamp associated with a respective probe data point; map-match the probe data points to one or more road segments of a road network; determine, for the probe data points, lanes of travel of the one or more road segments; determine a volume of traffic along the lanes of travel of the one or more road segments based on the lanes of travel of the one or more road segments determined for the probe data; determine an expected volume of traffic along the lanes of travel of the one or more road segments; generate an indication of a lane closure in response to a volume of traffic along a first lane of travel of the one or more road segments being a predetermined amount below an expected volume of traffic for the first lane of travel of the one or more road segments; and provide for at least one of route guidance information or at least semi-autonomous vehicle control in response to the indication of the lane closure.

According to an example embodiment, each probe data point of the plurality of probe data points is received from a probe apparatus of a plurality of probe apparatuses, each probe apparatus including one or more sensors and being onboard a respective vehicle. The program code instructions to determine the volume of traffic along the lanes of travel of the one or more road segments include, in some embodiments, program code instructions to determine a volume of traffic along the lanes of travel of the one or more road segments for an epoch having a first context. The program code instructions to determine the expected volume of traffic along the lanes of travel of the one or more road segments include, in some embodiments, program code instructions to determine the expected volume of traffic along the lanes of travel of the one or more road segments for a past epoch having a second context within a predefined similarity of the first context. The predefined similarity between the first context and the second context includes, in some embodiments, one or more of: same day of week, same time of day, same season of year, or same environmental conditions.

According to some embodiments, the predetermined amount below the expected volume of traffic for the first lane of travel of the one or more road segments comprises at least fifty percent less than the expected volume of traffic for the first lane of travel of the one or more road segments. The program code instructions to map-match the probe data points to one or more road segments of a road network include, in some embodiments, program code instructions to: identify one or more road segments corresponding to the probe data points based on latitude and longitude of the probe data points; determine lateral positions of the probe data points from a centerline of the identified one or more road segments; cluster the probe data points according to available lanes of the identified one or more road segments; and map-match the clustered probe data points to the available lanes of the identified one or more road segments. The program code instructions to provide for at least one of route guidance information or at least semi-autonomous vehicle control in response to the indication of the lane closure include program code instructions to: identify a lane closure of a road segment of the one or more road segments from the indication of the lane closure; determine a path including the road segment and an available lane of travel along the road segment; and cause at least semi-autonomous vehicle control to move a vehicle to the available lane of travel along the road segment. The computer program product of certain embodiments further includes program code instructions to receive an indication of a lane closure of the first lane of travel of the one or more road segments associated with a road work event, and increase a confidence of the indication of the lane closure.

Embodiments provided herein include a method including: receiving a plurality of probe data points, where the probe data points include at least a location and a timestamp associated with a respective probe data point; map-matching the probe data points to one or more road segments of a road network; determining, for the probe data points, lanes of travel of the one or more road segments; determining a volume of traffic along the lanes of travel of the one or more road segments based on the lanes of travel of the one or more road segments determined for the probe data; determining an expected volume of traffic along the lanes of travel of the one or more road segments; generating an indication of a lane closure in response to a volume of traffic along a first lane of travel of the one or more road segments being a predetermined amount below an expected volume of traffic for the first lane of travel of the one or more road segments; and providing for at least one of route guidance information or at least semi-autonomous vehicle control in response to the indication of the lane closure.

According to an example embodiment, each probe data point of the plurality of probe data points is received from a probe apparatus of a plurality of probe apparatuses, each probe apparatus including one or more sensors and being onboard a respective vehicle. According to some embodiments, determining the volume of traffic along the lanes of travel of the one or more road segments includes determining a volume of traffic along the lanes of travel of the one or more road segments for an epoch having a first context. According to some embodiments, determining the expected volume of traffic along the lanes of travel of the one or more road segments includes determining the expected volume of traffic along the lanes of travel of the one or more road segments for a past epoch having a second context within a predefined similarity of the first context. The predefined similarity between the first context and the second context includes, in some embodiments, one or more of: same day of week, same time of day, same season of year, or same environmental conditions.

According to some embodiments, the predetermined amount below the expected volume of traffic for the first lane of travel of the one or more road segments comprises at least fifty percent less than the expected volume of traffic for the first lane of travel of the one or more road segments. According to some embodiments, map-matching the probe data points to one or more road segments of a road network includes: identifying one or more road segments corresponding to the probe data points based on latitude and longitude of the probe data points; determining lateral positions of the probe data points from a centerline of the identified one or more road segments; clustering the probe data points according to available lanes of the identified one or more road segments; and map-matching the clustered probe data points to the available lanes of the identified one or more road segments. According to some embodiments, providing for at least one of route guidance information or at least semi-autonomous vehicle control in response to the indication of the lane closure includes: identifying a lane closure of a road segment of the one or more road segments from the indication of the lane closure; determining a path including the road segment and an available lane of travel along the road segment; and causing at least semi-autonomous vehicle control to move a vehicle to the available lane of travel along the road segment. The method of certain embodiments further includes receiving an indication of a lane closure of the first lane of travel of the one or more road segments associated with a road work event, and increasing a confidence of the indication of the lane closure.

Embodiments provided herein include an apparatus including: means for receiving a plurality of probe data points, where the probe data points include at least a location and a timestamp associated with a respective probe data point; means for map-matching the probe data points to one or more road segments of a road network; means for determining, for the probe data points, lanes of travel of the one or more road segments; means for determining a volume of traffic along the lanes of travel of the one or more road segments based on the lanes of travel of the one or more road segments determined for the probe data; means for determining an expected volume of traffic along the lanes of travel of the one or more road segments; means for generating an indication of a lane closure in response to a volume of traffic along a first lane of travel of the one or more road segments being a predetermined amount below an expected volume of traffic for the first lane of travel of the one or more road segments; and means for providing for at least one of route guidance information or at least semi-autonomous vehicle control in response to the indication of the lane closure.

According to an example embodiment, each probe data point of the plurality of probe data points is received from a probe apparatus of a plurality of probe apparatuses, each probe apparatus including one or more sensors and being onboard a respective vehicle. According to some embodiments, the means for determining the volume of traffic along the lanes of travel of the one or more road segments includes means for determining a volume of traffic along the lanes of travel of the one or more road segments for an epoch having a first context. According to some embodiments, the means for determining the expected volume of traffic along the lanes of travel of the one or more road segments includes means for determining the expected volume of traffic along the lanes of travel of the one or more road segments for a past epoch having a second context within a predefined similarity of the first context. The predefined similarity between the first context and the second context includes, in some embodiments, one or more of: same day of week, same time of day, same season of year, or same environmental conditions.

According to some embodiments, the predetermined amount below the expected volume of traffic for the first lane of travel of the one or more road segments includes at least fifty percent less than the expected volume of traffic for the first lane of travel of the one or more road segments. According to some embodiments, the means for map-matching the probe data points to one or more road segments of a road network includes: means for identifying one or more road segments corresponding to the probe data points based on latitude and longitude of the probe data points; means for determining lateral positions of the probe data points from a centerline of the identified one or more road segments; means for clustering the probe data points according to available lanes of the identified one or more road segments; and means for map-matching the clustered probe data points to the available lanes of the identified one or more road segments. According to some embodiments, the means for providing for at least one of route guidance information or at least semi-autonomous vehicle control in response to the indication of the lane closure includes: means for identifying a lane closure of a road segment of the one or more road segments from the indication of the lane closure; means for determining a path including the road segment and an available lane of travel along the road segment; and means for causing at least semi-autonomous vehicle control to move a vehicle to the available lane of travel along the road segment. The apparatus of certain embodiments further includes receiving an indication of a lane closure of the first lane of travel of the one or more road segments associated with a road work event, and means for increasing a confidence of the indication of the lane closure.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
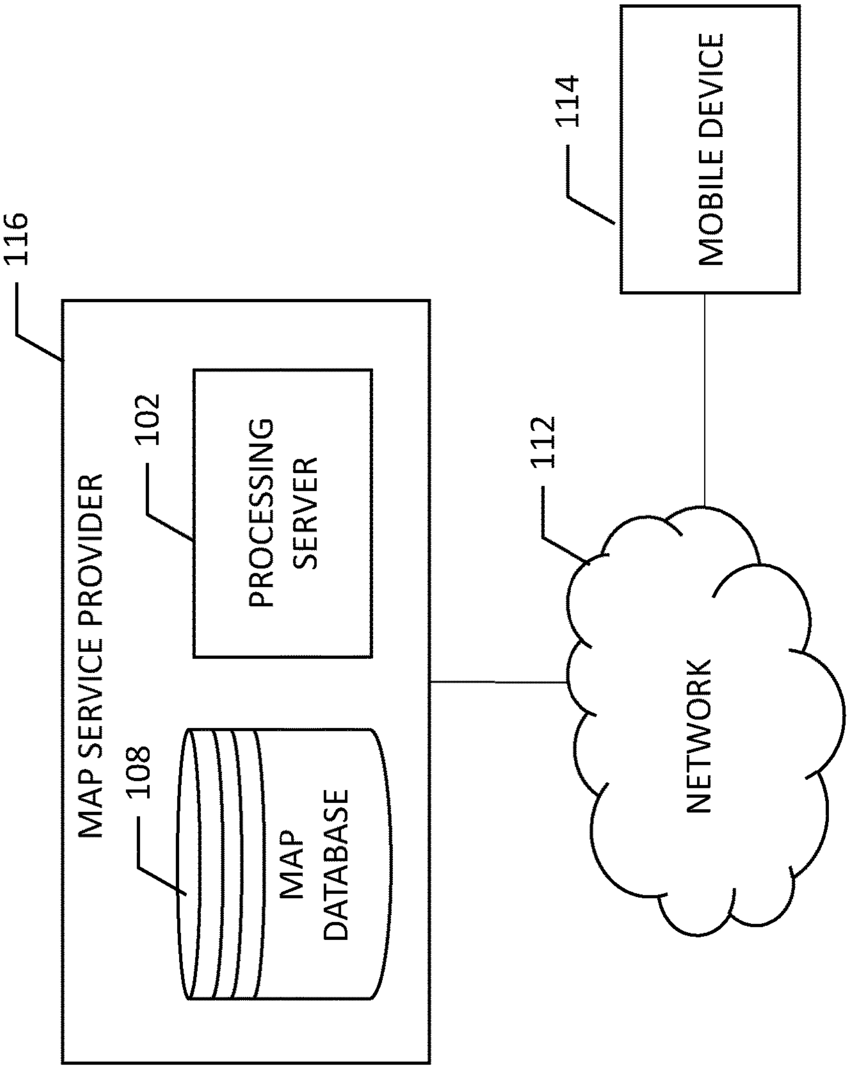
Figure 2:
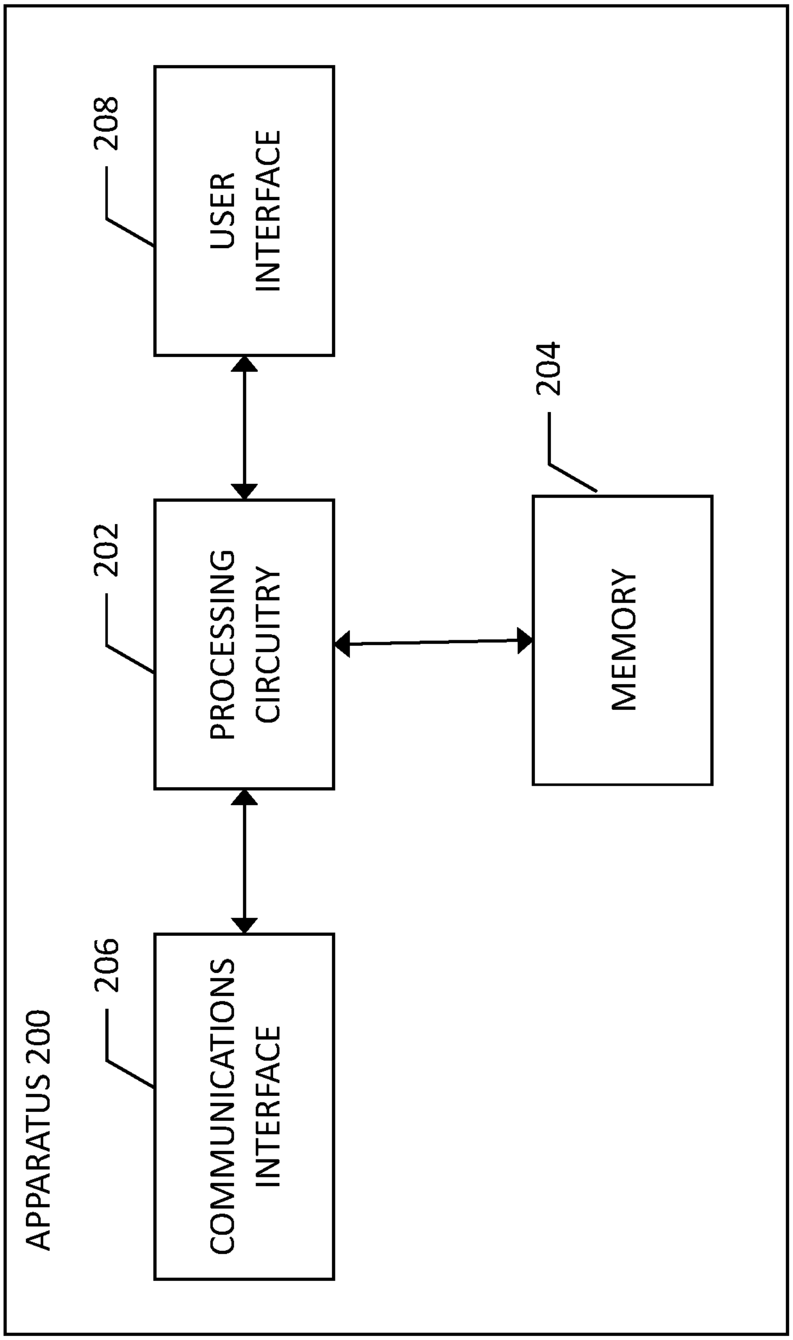
Figure 3:
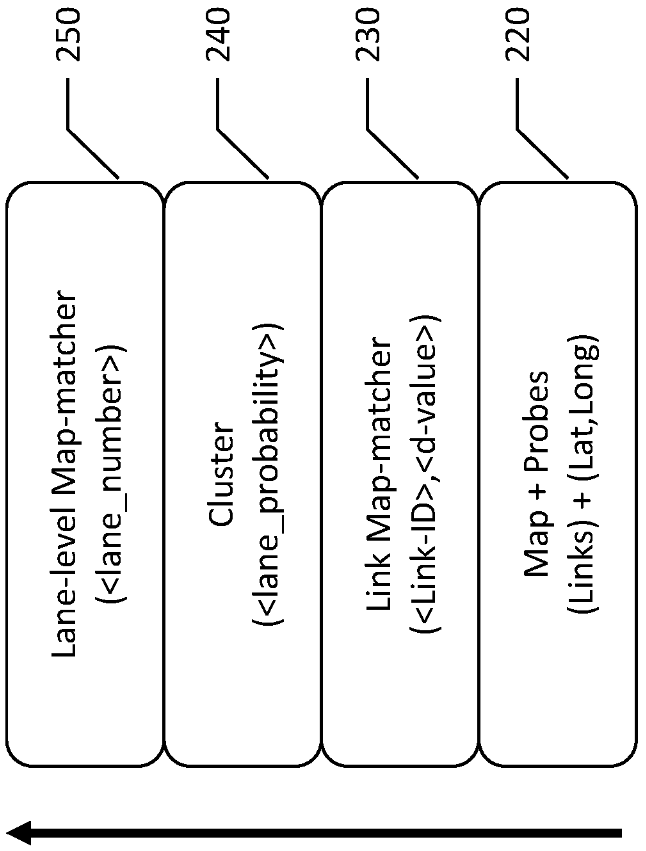
Figure 4:
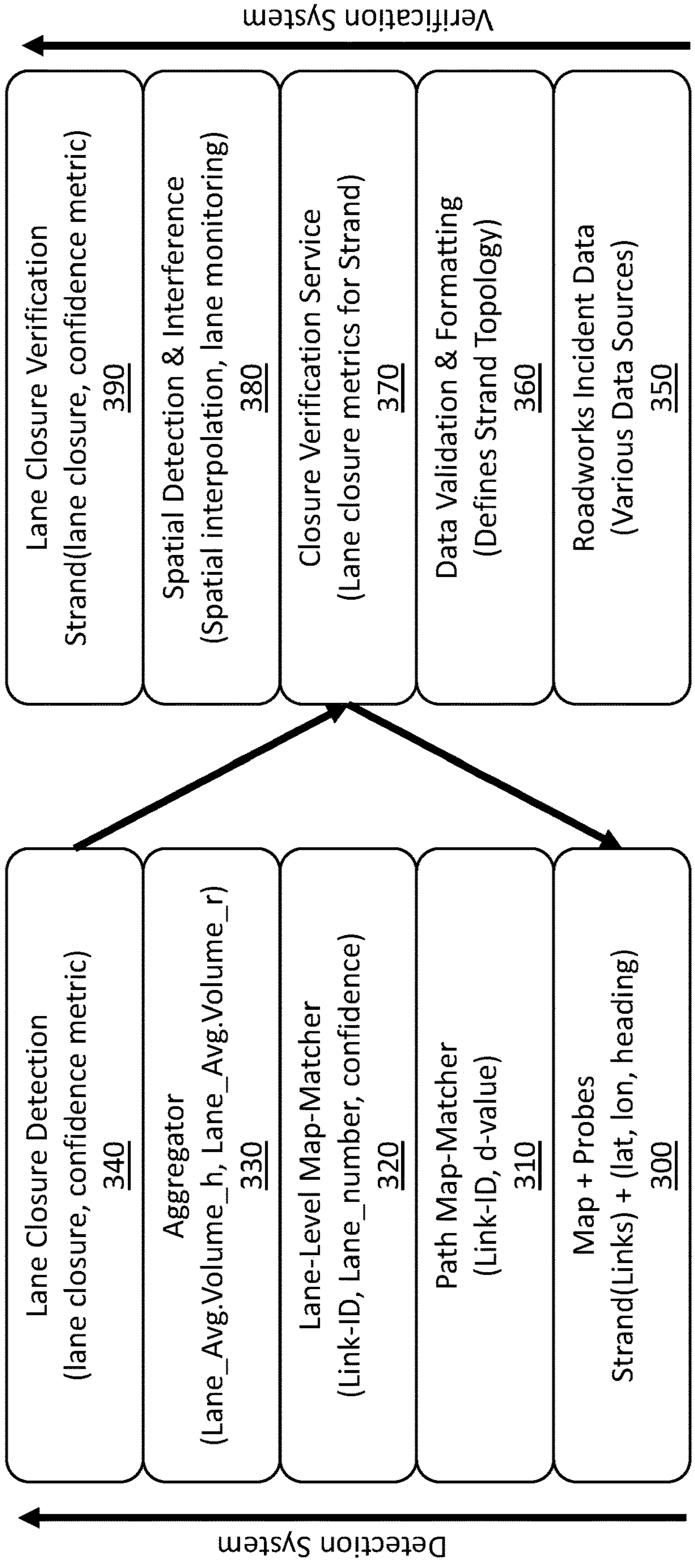
Figure 5:
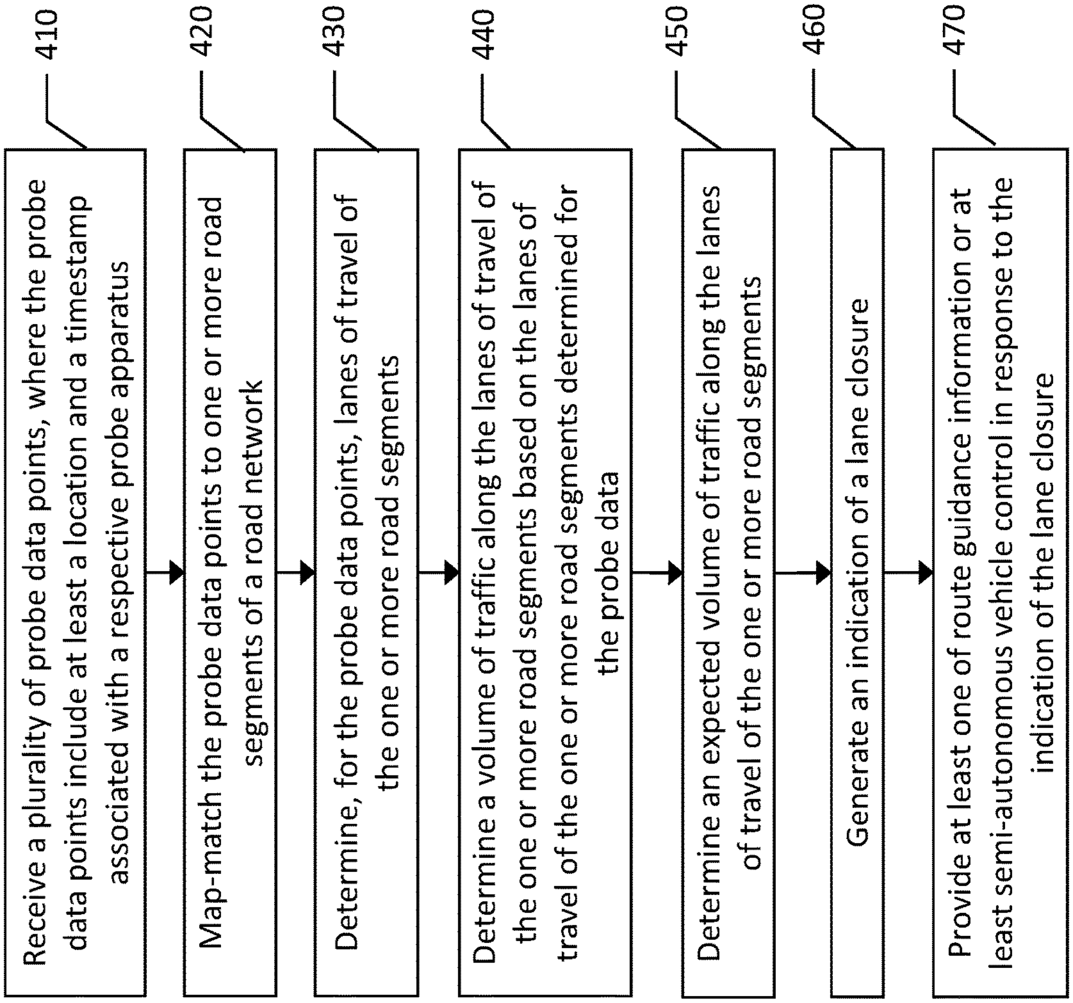

Having thus described example embodiments of the invention in general terms, reference will now be made to the accompanying drawings, which are not necessarily drawn to scale, and wherein:

FIG. 1 illustrates a communications diagram in accordance with an example embodiment;

FIG. 2 is a block diagram of an apparatus that may be specifically configured for detecting and verifying lane closures based on vehicle probe data in accordance with an example embodiment described herein;

FIG. 3 illustrates a flowchart of the process of lane-level map-matching of probe data according to an example embodiment described herein;

FIG. 4 illustrates a system for lane closure detection and verification according to an example embodiment of the present disclosure; and FIG. 5 is a flowchart of a method for detecting and verifying lane closures based on vehicle probe data according to an example embodiment described herein.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for determining lane closures along a road, and more particularly, to determining and verifying lane closures using lane level map-matching to monitor all lanes of a road. Embodiments provide methods and algorithms for automatic detection of lane closures using probe data. Lane closure occurs when one or more lanes of a road segment are closed, blocked, or barricaded such that the lane is no longer available for traversal by vehicles traveling along the road segment. There are two primary types of lane closures including planned lane closures that may occur for construction, and unplanned lane closures that may occur for a vehicle accident. Embodiments described herein detect lane closures using probe data, but are also able to identify specific lanes that are closed and detect lane shifts (e.g., due to lane closures or construction).

Lane closures are generally difficult to detect in probe data as traffic still traverses the road segment where a lane closure is present. The detection of lane closures is important for safety and to aid in navigational guidance and/or autonomous or semi-autonomous vehicle control. Embodiments described herein employ a lane-level map-matcher (LLMM)

to monitor all lanes of a strand, which includes one or more road segments, where a lane closure is occurring and needs to be verified. The lane-level map-matcher map-matches vehicle probe data to each lane of one or more road segments and uses changes in volume of traffic flow to identify lane closures.

FIG. 1 illustrates a communication diagram of an example embodiment of a system for implementing example embodiments described herein. The illustrated embodiment of FIG. 1 includes a map services provider system 116, a processing server 102 and map database 108 in communication with one or more mobile devices 114 through a network 112. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn paths there through. Thus, it is important to have continuous features remain continuous within the map data as provided by embodiments herein.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. Also, remote sensing, such as aerial or satellite photography, can be used to generate map geometries directly or through machine learning as described herein. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

While the mobile device 114 may be used by an end-user for navigation, driver assistance, or various other features, the mobile device 114 may provide map data to the map services provider 116 for purposes of updating, building, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for revising map geometry based on a detailed analysis of probe data and existing map geometry. The apparatus may include or otherwise be in communication with a processing circuitry 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processing circuitry 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processing circuitry 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processing circuitry 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processing circuitry 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Embodiments of the present disclosure facilitate navigational control and at least semi-autonomous control of vehicles based on the detection of lane closures. Embodiments determine lane closures along a road using lane-level map-matching to help vehicles navigate an area having one or more lane closures safely and efficiently. Lane closures can be identified in real-time or near real-time (e.g., as traffic probe data is demonstrating a lane closure) or in an offline manner where lane closures are less temporally sensitive. Lane closures relating to vehicle accidents, disabled vehicles, or the like, are temporally sensitive and dynamic in nature as they occur without warning, and are resolved typically in a matter of minutes to a matter of hours. Lane closures relating to road construction may be temporally sensitive, such as when a lane is closed briefly for an emergency repair or for work occurring proximate a road. Other construction-related lane closures may be less temporally sensitive, and may be planned closures. Such closures may last days, weeks, or even months.

Embodiments of the present disclosure use a lane-level map-matcher to monitor all lanes of road segments. The lane-level map-matcher matches probe data from vehicles to individual lanes of a road segment. With an understanding of the number of available lanes of a road segment, the volumes of traffic on a per-lane basis can be used to determine when a lane closure is present. For a single strand (S) of one or more road segments with a known number of lanes (K), historical probe data for the stretch of road is gathered. This may be, for example, probe data from the prior week. The probe data includes at least location information (e.g., latitude and longitude) and a timestamp. The probe data is map-matched to the road segment, and a lane is determined to establish the average probe volume per-lane per-epoch (e.g., 15 minutes, 60 minutes, etc.) of the day. A lane-level map-matcher is run on current (e.g., real-time or near real-time) probe data to map-match each probe data point to a lane. The current volume of traffic of a lane for a current epoch can then be compared against a historical probe volume for that lane at a comparable or a historically-similar epoch (e.g., having the same or similar context). The current probe volume for each lane can be subtracted from the historical probe volume for the respective lane. A difference in volume satisfying a predetermined threshold can be determined to be indicative of a lane closure.

Lane closure detection according to example embodiments described herein can be performed in real-time or near real-time and offline using different but related algorithms. According to an example embodiment for offline lane closure detection, based on the collected probe data for a historical period, a vehicle lane speed profile (VLSP) is generated for every road segment. The historical period used may include, for example, three months. A lane-level map-matcher is then performed on each probe trajectory (e.g., each sequence of probe data points from a single probe) of the historical probe data and each probe is map-matched to a lane of the road segments. Probe data is aggregated on a per-lane basis for road segments for each epoch. The epochs may include, for example, fifteen minute increments. Further, epochs may be grouped by day of the week, such as a fifteen minute increment at the same time each Monday can be grouped together. The historical average speed and average volume can then be generated from the aggregated probe data on per-epoch basis. This may be on a per-week epoch basis, such as for every epoch of a week, data is aggregated for a respective epoch from each week of the historical data. This provides a baseline for the per-lane average speed and volume given a certain time of the day and day of the week.

Real-time lane closure detection is performed by example embodiments through gathering of probe trajectory data for a probe/vehicle and a lane-level map-matching algorithm is performed to determine the lane of travel of the probe/vehicle as it travels along road segments of a road network. Probe data is gathered on a per-lane basis for each road segment for a sliding window of time. For example, probe data that is more than fifteen minutes old or thirty minutes old is discarded as new probe data is gathered. This moving window of probe data is analyzed on a per-lane basis to determine the volume of probe data in each lane of each road segment. When probe data for a lane of a road segment is lower than expected, the possibility of a lane closure is identified. The expected volume of traffic along a road segment can be based on historical probe data, such as historical epochs of a similar context, such as the same day of week, same time of day. The context can optionally include dynamic factors such as weather, season, event status (e.g., traffic volumes are heavier before and after sporting events proximate the sporting event location).

In real-time lane closure detection, the confidence of the presence of a closed lane is important as erroneous lane closure reporting can lead to distrust in such reports in the future. Thus, certain embodiments employ a process to measure confidence of the presence of a lane closure. In response to initial detection of a possible lane closure, such as when traffic volume for a given lane of a given road segment is lower than expected by at least a predetermined margin (e.g., 75% lower than expected), the confidence level of a lane closure can be incrementally increased. The first incremental increase in confidence may be to a 50% certainty that a lane closure is present. If probe data from a next consecutive epoch continues to indicate that the same lane closure is present, the confidence may be increased, such as by 15%. The epoch may be, for example, fifteen minutes. In real-time lane closure detection, a continuous trend in decreasing volume for a particular lane over a predetermined time, such as twenty minutes, may lead to a high confidence of the presence of a lane closure.

Because lane-level map-matching is not necessarily entirely accurate, lane closures may be present where there is some degree of traffic volume detected. However, as lane-level map-matching improves, more binary detection of lane closures is possible. As such, lane closures may not indicate zero traffic volume in probe data, even when there is zero traffic volume in reality. Thus, embodiments discern between expected traffic volumes in a given lane and observed (probe data) volumes for that lane.

The confidence level of the presence of a lane closure can be used in a number of ways to improve the detection and reporting of lane closures. According to an example embodiment where a map service provider 116 identifies a lane closure with a given confidence level, the lane closure can be reported to vehicles (e.g., via navigation systems and to autonomous vehicle controls) when the confidence level exceeds a predetermined value (e.g., 75% confidence). Optionally, the map service provider can report a lane closure detection and the confidence level even when a confidence level is less than a predetermined value such that a driver of a vehicle or an autonomous control of a vehicle can understand the likelihood of a lane closure being present based on the confidence. A driver or autonomous vehicle control may change lanes to avoid a potential closure, even if the confidence is relatively low. When confidence is higher, a driver or autonomous vehicle control may avoid a road segment with a lane closure if possible to do efficiently, for example.

Lane closure detection of example embodiments described herein can identify when a lane closure has ended in a manner similar to that described above. For example, if traffic volumes along a lane of a road segment increase to be within a predefined margin of expected traffic volumes, the lane closure can be ended and the reopening of the lane can be communicated, such as by map service provider 116 via network 112 to vehicles traveling within the road network.

In order to determine traffic volumes along individual lanes of road segments as described herein, probe data is first be map-matched on a granular level to establish a lane of travel of the probe trajectories. FIG. 3 illustrates the map-matching process for example embodiments described herein. The historical probe data is used at 220 together with map data, which may be from map database 108 of map service provider 116. The road segments/links are in the stored map data, while the probe data includes latitude and longitude of the probe as it traversed a geographical region. The link map-matcher 230 identifies a road segment or link by "link-ID" closest to the latitude and longitude of the probe data point. A "d-value" is the displacement value of the latitude and longitude relative to a centerline of the identified link. At 240, a layer of abstraction is created over the map to generate the lane probabilities of probe data points based on their lateral positions (d-value) relative to the link to form probe data point clusters on a per-lane basis. These form the emission probabilities of a Hidden Markov Model (HMM) in which the Viterbi algorithm may be used to make inference of the most probable lane(s) of a probe trajectory. Based on the most probable lane(s), the probe data points are map-matched on a lane level to a lane as it traverses the road segment at 250.

Historically, vehicle locationing means were error prone with accuracy insufficient to define a lane in which a vehicle is traveling. Using the disclosed lane-level map matching, vehicle probe data may be matched to a lane of travel, thereby providing an opportunity to generate the lane-level traffic volumes described above.

Lane-level traffic volumes and relative volumes may be generated based on analysis of historical vehicle probe data. This historical vehicle probe data may be from a rolling time window, such as the trailing year or years, or may be based on a period of months. The volume of data available may influence the length of the period over which historical data is gathered, such that a more frequently traveled road segment or network of roads may use a shorter period than a road segment or network of roads that is infrequently traveled. Further, the period may be limited based on infrastructure changes that may preclude accurate vehicle probe data from being gathered during a specific period of time or prior to a time after which the road infrastructure changed. These historical traffic volumes on a lane-level can be used to determine whether traffic volumes traveling along a lane of a road segment are normal, or if they are indicative of a lane closure.

FIG. 4 illustrates a system for lane closure detection and verification according to an example embodiment of the present disclosure. As shown, the probe data is received at 300 and map data is obtained. The probe data includes at least latitude, longitude, heading, and timestamp. The map data includes road segments or links that together form strands. The probe data is map-matched to a path at 310 including a link identifier (Link-ID) identifying the specific road segment and lateral position (d-value) within that road segment. The lane-level map-matcher matches the probe data to a lane number of a specific road segment together with a confidence value of the lane number identified. The data is aggregated at 330 with the lane average volumes. Based on the lane average volumes relative to historical or expected lane volumes, lane closure detection is performed at 340 through identification of the lane closure and a confidence metric associated with the lane closure.

The verification system of the illustrated embodiment collects roadwork incident data from various data sources as shown at 350. Roadwork incident data may be obtained from municipalities, transportation departments, local/regional government entities, private companies (e.g., contractors performing some or all of the work), etc. The roadwork incident data is validated and formatted at 360 where the strand or sequence of road segments associated with roadwork incidents is defined. This may be performed, for example, by map service provider 116 using map database 108. Closure verification is performed at 370, which is informed by the lane closure detection system to confirm the lane closures that are identified in roadwork incident data. Roadwork incident data may sometimes be inaccurate and the timing (e.g., start time, end time, duration) may be planned but not met. The verification system continues with spatial detection and interference at 380 where spatial interpolation occurs using lane closure detection and roadwork incident data. Lane closures are verified at 390 with the lane closure information and a confidence metric associated therewith.

FIG. 5 illustrates a flowchart depicting a method according to example embodiments of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processing circuitry 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 5 illustrates a flowchart of a method according to an example embodiment of the present invention for determining and verifying lane closures using lane-level map-matching to monitor all lanes of a road. As shown, a plurality of probe data points are received at 410, where the probe data points include at least a location and a timestamp associated with a respective probe data point. These probe data points may be retrieved from a database, such as map database 108 of map service provider 116, or provided in real-time or near real-time from probe apparatuses, such as an apparatus 200 of FIG. 2 operating as mobile device 114 of FIG. 1. The probe data points are map matched at 420 to one or more road segments of the road network. The probe data points include location information (e.g., latitude and longitude) which can be used with map data (e.g., map database 108) to determine a road segment along which a probe apparatus was traveling when generating the probe data point. At 430, the lanes of travel for the probe data points are determined along the one or more road segments. This may be performed by clustering of the probe data points along a width of the road segment based on a distance of the probe data points from a centerline of the road segment.

A volume of traffic along the lanes of the one or more road segments is determined at 440 based on the lanes of travel of the one or more road segments determined for the probe data. An expected volume of traffic along the lanes of travel of the one or more road segments is determined at 450. This may be based, for example, on historical probe data points which may be grouped by epoch to correspond with an epoch of the collected probe data points when establishing what volume of traffic is expected along specific lanes of a road segment. An indication of a lane closure is generated in response to a volume of traffic along a particular lane of travel being substantially lower than an expected volume of traffic at 460. For example, if a particular lane of a road segment has a traffic volume of 10% of an expected volume, the 10% may be improperly map-matched and the distinctly lower volume of traffic may indicate a lane closure. At least one of route guidance information or at least semi-autonomous vehicle control is provided at 470. This may include providing an indication to a driver of a lane closure such that they can take any necessary precautions and lane changes. An autonomous vehicle may be caused to change lanes to avoid a lane closure or to get further away from a lane closure, for example.

In an example embodiment, an apparatus for performing the method of FIG. 5 above may comprise a processor (e.g., the processing circuitry 202) configured to perform some or each of the operations (410-470) described above. The processing circuitry may, for example, be configured to perform the operations (410-470) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-470 may comprise, for example, the processing circuitry 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:

receive a plurality of probe data points, wherein the plurality of probe data points comprise at least a location and a timestamp associated with a respective probe data point;

map-match the plurality of probe data points to one or more road segments of a road network;

determine, for the plurality of probe data points, lanes of travel of the one or more road segments;

determine a non-zero volume of traffic along each lane of the lanes of travel of the one or more road segments based on the lanes of travel of the one or more road segments determined for the plurality of probe data points;

determine an expected volume of traffic along each lane of the lanes of travel of the one or more road segments;

generate an indication of a lane closure in response to a non-zero volume of traffic along a first lane of travel of the one or more road segments being a predetermined amount below an expected volume of traffic for the first lane of travel of the one or more road segments; and provide for at least one of route guidance information or at least semi-autonomous vehicle control in response to the indication of the lane closure.

2. The apparatus of claim 1, wherein causing the apparatus to determine the expected volume of traffic along each lane of the lanes of travel of the one or more road segments comprises causing the apparatus to determine the expected volume of traffic along each lane the lanes of travel of the one or more road segments for an epoch having a first context.

3. The apparatus of claim 2, wherein causing the apparatus to determine the expected volume of traffic along the lanes of travel of the one or more road segments comprises causing the apparatus to determine the expected volume of traffic along the lanes of travel of the one or more road segments for a past epoch having a second context within a predefined similarity of the first context.

4. The apparatus of claim 3, wherein the predefined similarity between the first context and the second context comprises one or more of: same day of week, same time of day, same season of year, or same environmental conditions.

5. The apparatus of claim 1, wherein causing the apparatus to map-match the plurality of probe data points to one or more road segments of a road network comprises causing the apparatus to:

identify one or more road segments corresponding to the plurality of probe data points based on latitude and longitude of the plurality of probe data points;

determine lateral positions of the plurality of probe data points from a centerline of the identified one or more road segments;

cluster the plurality of probe data points according to available lanes of the identified one or more road segments to form clustered probe data points; and map-match the clustered probe data points to the available lanes of the identified one or more road segments.

6. The apparatus of claim 1, wherein causing the apparatus to provide for at least one of route guidance information or at least semi-autonomous vehicle control in response to the indication of the lane closure comprises causing the apparatus to:

identify a lane closure of a road segment of the one or more road segments from the indication of the lane closure;

determine a path including the road segment and an available lane of travel along the road segment; and cause at least semi-autonomous vehicle control to move a vehicle to the available lane of travel along the road segment.

7. The apparatus of claim 1, wherein the apparatus is further caused to:

receive an indication of a lane closure of the first lane of travel of the one or more road segments associated with a road work event; and increase a confidence of the indication of the lane closure.

8. The apparatus of claim 1, wherein the predetermined amount below the expected volume of traffic for the first lane of travel is a predetermined percentage below the expected volume of traffic for the first lane of travel.

9. The apparatus of claim 1, wherein the predetermined amount below the expected volume of traffic for the first lane of travel is a predetermined percentage below a historic volume of traffic for the first lane of travel.

10. A computer program product comprising at least one non-transitory computer-readable storage medium having computer-executable program code instructions stored therein, the computer-executable program code instructions comprising program code instructions to:

receive a plurality of probe data points, wherein the plurality of probe data points comprise at least a location and a timestamp associated with a respective probe data point;

map-match the plurality of probe data points to one or more road segments of a road network;

determine, for the plurality of probe data points, lanes of travel of the one or more road segments;

determine a non-zero volume of traffic along each lane of the lanes of travel of the one or more road segments based on the lanes of travel of the one or more road segments determined for the plurality of probe data points;

determine an expected volume of traffic along each lane of the lanes of travel of the one or more road segments;

generate an indication of a lane closure in response to a non-zero volume of traffic along a first lane of travel of the one or more road segments being a predetermined amount below an expected volume of traffic for the first lane of travel of the one or more road segments; and provide for at least one of route guidance information or at least semi-autonomous vehicle control in response to the indication of the lane closure.

11. The computer program product of claim 10, wherein each probe data point of the plurality of probe data points is received from a probe apparatus of a plurality of probe apparatuses, each probe apparatus comprising one or more sensors and being onboard a respective vehicle.

12. The computer program product of claim 10, wherein the program code instructions to determine the expected volume of traffic along the lanes of travel of the one or more road segments comprise program code instructions to determine the expected volume of traffic along the lanes of travel of the one or more road segments for an epoch having a first context.

13. The computer program product of claim 12, wherein the program code instructions to determine the expected volume of traffic along the lanes of travel of the one or more road segments comprise program code instructions to determine the expected volume of traffic along the lanes of travel of the one or more road segments for a past epoch having a second context within a predefined similarity of the first context.

14. The computer program product of claim 13, wherein the predefined similarity between the first context and the second context comprises one or more of: same day of week, same time of day, same season of year, or same environmental conditions.

15. The computer program product of claim 10, wherein the predetermined amount below the expected volume of traffic for the first lane of travel of the one or more road segments comprises at least fifty percent less than the expected volume of traffic for the first lane of travel of the one or more road segments.

16. The computer program product of claim 10, wherein the program code instructions to map-match the plurality of probe data points to one or more road segments of a road network comprise program code instructions to:

identify one or more road segments corresponding to the plurality of probe data points based on latitude and longitude of the plurality of probe data points;

determine lateral positions of the plurality of probe data points from a centerline of the identified one or more road segments;

cluster the plurality of probe data points according to available lanes of the identified one or more road segments to form clustered probe data points; and map-match the clustered probe data points to the available lanes of the identified one or more road segments.

17. The computer program product of claim 10, wherein the program code instructions to provide for at least one of route guidance information or at least semi-autonomous vehicle control in response to the indication of the lane closure comprise program code instructions to:

identify a lane closure of a road segment of the one or more road segments from the indication of the lane closure;

determine a path including the road segment and an available lane of travel along the road segment; and cause at least semi-autonomous vehicle control to move a vehicle to the available lane of travel along the road segment.

18. A method comprising:

receiving a plurality of probe data points, wherein the plurality of probe data points comprise at least a location and a timestamp associated with a respective probe data point;

map-matching the plurality of probe data points to one or more road segments of a road network;

determining, for the plurality of probe data points, lanes of travel of the one or more road segments;

determining a non-zero volume of traffic along each lane of the lanes of travel of the one or more road segments based on the lanes of travel of the one or more road segments determined for the plurality of probe data points;

determining an expected volume of traffic along each lane of the lanes of travel of the one or more road segments;

generating an indication of a lane closure in response to a non-zero volume of traffic along a first lane of travel of the one or more road segments being a predetermined amount below an expected volume of traffic for the first lane of travel of the one or more road segments; and providing for at least one of route guidance information or at least semi-autonomous vehicle control in response to the indication of the lane closure.

19. The method of claim 18, wherein determining the expected volume of traffic along the lanes of travel of the one or more road segments comprises determining the expected volume of traffic along the lanes of travel of the one or more road segments for an epoch having a first context.

20. The method of claim 19, wherein determining the expected volume of traffic along the lanes of travel of the one or more road segments comprises determining the expected volume of traffic along the lanes of travel of the one or more road segments for a past epoch having a second context within a predefined similarity of the first context.

* * * * *